(12) United States Patent
Kobayashi

(10) Patent No.: US 10,385,818 B2
(45) Date of Patent: Aug. 20, 2019

(54) VEHICLE CONTROL APPARATUS

(71) Applicant: DENSO CORPORATION, Kariya, Aichi-pref. (JP)

(72) Inventor: Hisaaki Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 40 days.

(21) Appl. No.: 15/748,623

(22) PCT Filed: May 27, 2016

(86) PCT No.: PCT/JP2016/002580
§ 371 (c)(1),
(2) Date: Jan. 29, 2018

(87) PCT Pub. No.: WO2017/033354
PCT Pub. Date: Mar. 2, 2017

(65) Prior Publication Data
US 2019/0003440 A1    Jan. 3, 2019

(30) Foreign Application Priority Data
Aug. 21, 2015  (JP) .................................. 2015-163980

(51) Int. Cl.
*F02N 11/08*     (2006.01)
*B60K 6/28*      (2007.10)
(Continued)

(52) U.S. Cl.
CPC ............ *F02N 11/0844* (2013.01); *B60K 6/28* (2013.01); *B60K 6/442* (2013.01); *B60K 6/485* (2013.01);
(Continued)

(58) Field of Classification Search
CPC ...... H02P 1/00; H02P 1/04; H02P 1/24; H02P 1/26; H02P 1/265; H02P 3/00; H02P 3/14;
(Continued)

(56) References Cited

U.S. PATENT DOCUMENTS

2009/0306841 A1* 12/2009 Miwa .................... B60L 53/305
701/22
2012/0226401 A1    9/2012 Naito

FOREIGN PATENT DOCUMENTS

JP    2001-025103 A    1/2001
JP    2007-255294 A    10/2007
(Continued)

*Primary Examiner* — Antony M Paul
(74) *Attorney, Agent, or Firm* — Oliff PLC

(57) ABSTRACT

A vehicle control apparatus comprises an engine, a starter, an accessory battery, and a high-voltage battery. The vehicle control apparatus is equipped with a DC-DC converter that is connected between the accessory battery and the high-voltage battery, a capacitor that is connected to a circuit on a side of the high-voltage battery, a high-voltage battery determination portion, and a startup control portion. The startup control portion executes power boost-startup control, whereby an output voltage of the accessory battery is boosted by the DC-DC converter, the capacitor is charged with necessary electrical energy for starting the engine by using an output voltage of the DC-DC converter, and the starter is driven to start the engine by using the electrical energy charged in the capacitor.

3 Claims, 9 Drawing Sheets

(51) Int. Cl.

| | |
|---|---|
| *B60K 6/442* | (2007.10) |
| *B60K 6/485* | (2007.10) |
| *B60K 6/543* | (2007.10) |
| *B60K 6/547* | (2007.10) |
| *B60W 10/00* | (2006.01) |
| *B60W 10/06* | (2006.01) |
| *B60W 10/08* | (2006.01) |
| *B60W 10/26* | (2006.01) |
| *F02N 11/04* | (2006.01) |
| *F02D 29/02* | (2006.01) |
| *F02D 29/06* | (2006.01) |
| *B60W 20/50* | (2016.01) |

(52) U.S. Cl.
CPC .............. *B60K 6/543* (2013.01); *B60K 6/547* (2013.01); *B60W 10/00* (2013.01); *B60W 10/06* (2013.01); *B60W 10/08* (2013.01); *B60W 10/26* (2013.01); *F02N 11/04* (2013.01); *F02N 11/08* (2013.01); *B60W 20/50* (2013.01); *F02D 29/02* (2013.01); *F02D 29/06* (2013.01); *Y02T 10/6226* (2013.01); *Y02T 10/6234* (2013.01); *Y02T 10/6286* (2013.01)

(58) Field of Classification Search
CPC ...... H02P 3/26; H02P 4/00; H02P 5/00; H02P 6/00; H02P 6/04; H02P 6/14; H02P 21/00; H02P 23/00; H02P 25/00; H02P 25/14; H02P 27/00; H02P 27/04; H02P 27/06; H02P 27/08; H02P 31/00; H02P 2005/1616; H02P 2201/07; H02P 2201/09; H02P 3/18; G05B 11/28
USPC .......... 318/139, 400.01, 700, 701, 727, 799, 318/800, 801, 430, 437, 362, 374, 375, 318/376, 445; 363/40, 44, 95, 174
See application file for complete search history.

(56) References Cited

FOREIGN PATENT DOCUMENTS

| | | |
|---|---|---|
| JP | 2014-024452 A | 2/2014 |
| JP | 2014-091504 A | 5/2014 |

* cited by examiner

VEHICLE CONTROL APPARATUS

CROSS REFERENCE TO RELATED APPLICATION

This application is based on Japanese Patent Application No. 2015-163980 filed on Aug. 21, 2015, the disclosure of which is incorporated herein by reference.

TECHNICAL FIELD

The present disclosure relates to a vehicle control apparatus that starts an engine by driving a starter with power of a high-voltage battery.

BACKGROUND ART

In recent years, a hybrid vehicle equipped with an engine and a motor generator (MG) as power sources of a vehicle has attracted attention due to societal demands for fuel-efficient, low-emission vehicles. An example of such a hybrid vehicle is described in Patent Literature 1. The hybrid vehicle described in the literature uses an MG connected to a high-voltage battery (a power storage device) as a starter, and cranks and starts an engine by driving the MG with power of the high-voltage battery. When enough power cannot be supplied from the high-voltage battery to the MG due to a failure of the high-voltage battery or the like at the time a start request for the engine is made while the vehicle travels, the engine is started by using power generated from regenerative power generation in which kinetic energy of the vehicle is converted into electrical energy by the MG.

PRIOR ART LITERATURE

Patent Literature

Patent Literature 1: JP 2012-180004 A

SUMMARY OF INVENTION

According to the technique described in Patent Literature 1, the engine may not be started when regenerative power generation cannot be performed while the vehicle is at a standstill at the time of a trouble with the high-voltage battery that is unable to supply enough power therefrom to the MG due to the failure of the high-voltage battery, or when regenerative power generation cannot be performed due to a failure of the MG or an inverter.

It is an object of the present disclosure to provide a vehicle control apparatus capable of starting an engine by driving a starter even in the event of a trouble with a high-voltage battery in a system that starts the engine by driving the starter with power of the high-voltage battery.

According to one example of the present disclosure, a vehicle control apparatus includes: an engine that serves as a power source of a vehicle; a starter that cranks the engine; an accessory battery that supplies power to accessory of the vehicle; and a high-voltage battery that supplies power to the starter and has an output voltage higher than an output voltage of the accessory battery. The vehicle control apparatus includes: a DC-DC converter that is connected between the accessory battery and the high-voltage battery; a capacitor that is connected to a circuit on a side of the high-voltage battery; a high-voltage battery determination portion that determines whether the high-voltage battery has an abnormality of a failure or an insufficient state of charge; and a startup control portion that executes power boost-startup control when the high-voltage battery determination portion determines that the high-voltage battery has an abnormality at a time a start request for the engine is made, the power boost-startup control boosting the output voltage of the accessory battery by the DC-DC converter, charging the capacitor with electrical energy required to start the engine by using power output from the DC-DC converter, and starting the engine by driving the starter with the electrical energy charged in the capacitor.

According to this configuration, the power boost-startup control is executed when it is determined that the high-voltage battery has an abnormality at the time the start request for the engine is made. In the power boost-startup control, the output voltage of the accessory battery is boosted by the DC-DC converter to charge the capacitor with electrical energy by using the power output from the DC-DC converter, so that the engine is started by driving the starter with the electrical energy charged in the capacitor. The engine can thus be started by driving the starter with the power of the accessory battery even when the high-voltage battery has an abnormality.

In addition, the electrical energy required for starting the engine is temporarily charged in the capacitor so that the starter is driven by the electrical energy charged in the capacitor. With this, it may be possible to prevent a sudden fluctuation in the voltage of the accessory battery and an accompanying adverse effect on the accessory due to the power consumed by the starter while at the same time preventing an increase in power for instantaneous energization of the DC-DC converter. In addition, it may be unnecessary to maintain the state of charge (SOC) of the high-voltage battery higher than or equal to a value required for starting the engine at all times in preparation for a next engine startup, whereby it may be possible to lower the lower limit for the usable range of the SOC of the high-voltage battery.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Figure 1:
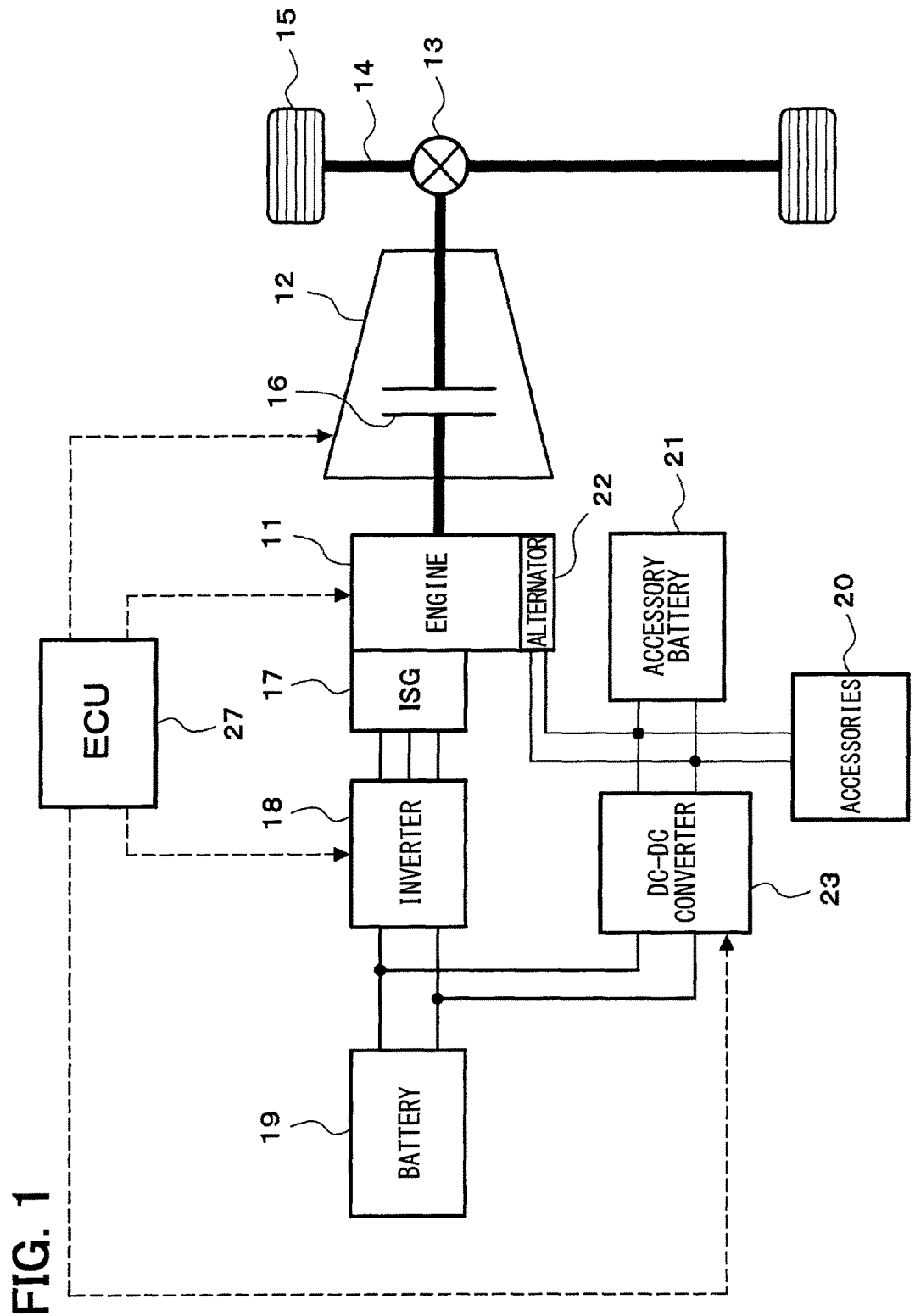
FIG. 1 is a diagram illustrating a schematic configuration of a vehicle drive control system according to a first embodiment of the present disclosure.

Hereinafter, some embodiments embodying modes for carrying out the present disclosure will be described.

First Embodiment

A first embodiment of the present disclosure will be described with reference to FIG. 1 to FIG. 3.

A schematic configuration of a vehicle drive control system will be described with reference to FIG. 1.

An engine 11 which is an internal combustion engine is mounted as a power source of a vehicle. Power of an output shaft (a crankshaft) of the engine 11 is transmitted to a transmission 12, and power of an output shaft of the transmission 12 is transmitted to wheels 15 via a differential gear mechanism 13, an axle 14, and the like. The transmission 12 may be a stepped transmission by which a gear position is shifted stepwise from multiple gear positions or a continuously variable transmission (CVT) by which the gear is shifted steplessly. The transmission 12 incorporates a clutch 16 for intermitting power transmission. The clutch 16 may be a hydraulic clutch driven hydraulically or an electromagnetic clutch driven electromagnetically. The clutch 16 may be provided separately from the transmission 12 (disposed between the engine 11 and the transmission 12, for example).

As a starter for cranking the engine 11, a high-voltage integrated starter-generator (ISG) 17 also serving as a generator is provided. The high-voltage ISG 17 is composed of an AC motor or the like driven by an inverter 18 described later. A high-voltage battery 19 for supplying power to the high-voltage ISG 17 and an accessory battery 21 (corresponding to a low-voltage battery) for supplying power to an accessory 20 (such as electrical components including a blower fan, a headlight, and a wiper) of the vehicle are mounted. The high-voltage battery 19 is composed of a secondary battery such as a lithium ion battery or a nickel hydrogen battery that outputs a high voltage of 200 V to 300 V, for example. On the other hand, the accessory battery 21 is composed of a secondary battery such as a lead storage battery which outputs a low voltage of 12 V, for example.

The ISG inverter 18 for driving the high-voltage ISG 17 is connected to the high-voltage battery 19, so that the high-voltage ISG 17 exchanges power with the high-voltage battery 19 via the ISG inverter 18. An alternator 22 driven by the power of the engine 11 is connected to the accessory battery 21 so that power generated by the alternator 22 is charged in the accessory battery 21.

A bidirectional DC-DC converter 23 is connected between the accessory battery 21 and the high-voltage battery 19. The bidirectional DC-DC converter 23 has a function of boosting a voltage on the side of the accessory battery 21 (such as an output voltage of the accessory battery 21 or a generated voltage of the alternator 22) and outputting the voltage to the side of the high-voltage battery 19. The bidirectional DC-DC converter 23 also has a function of stepping down a voltage on the side of the high-voltage battery 19 (such as an output voltage of the high-voltage battery 19 or a generated voltage of the high-voltage ISG 17) and outputting the voltage to the side of the accessory battery 21.

Figure 2:
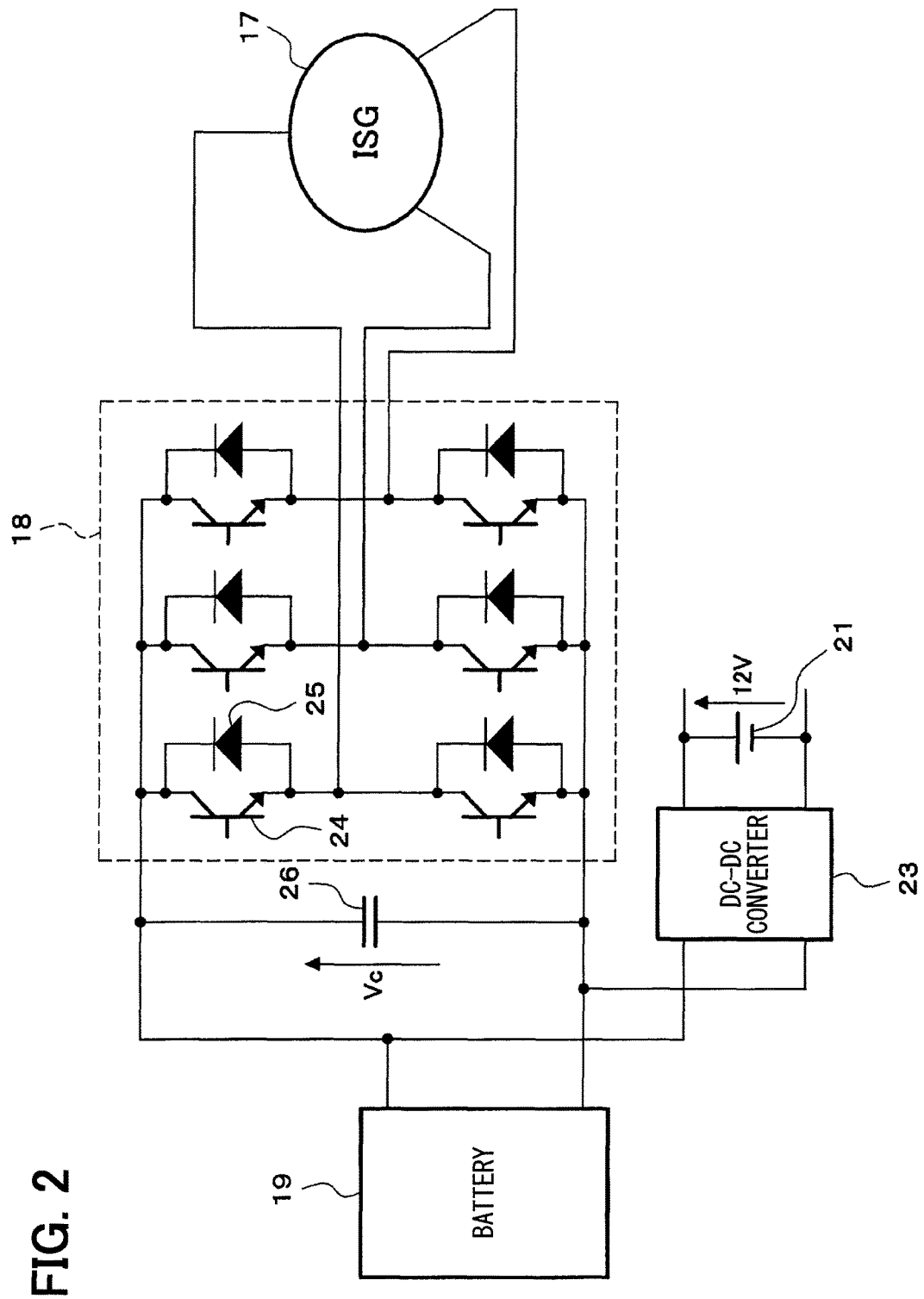
FIG. 2 is a diagram illustrating a circuit configuration of a system for driving a high-voltage integrated starter-generator (ISG) according to the first embodiment.

As illustrated in FIG. 2, the ISG inverter 18 is provided with six switching elements 24 (switching elements for phases in an upper arm and switching elements for phases in a lower arm), where each switching element 24 is connected in parallel with a freewheel diode 25. This ISG inverter 18 converts DC power of the high-voltage battery 19 into three-phase AC power to drive the high-voltage ISG 17, or converts three-phase AC power generated by the high-voltage ISG 17 into DC power to charge the high-voltage battery 19. A smoothing capacitor 26 is connected between the high-voltage battery 19 and the ISG inverter 18. The smoothing capacitor 26 may instead be incorporated in the ISG inverter 18.

As illustrated in FIG. 1, the engine 11, the transmission 12, the ISG inverter 18, the bidirectional DC-DC converter 23, and the like are controlled by an electronic control unit (hereinafter denoted as ECU) 27. The engine 11, the transmission 12, the ISG inverter 18, the bidirectional DC-DC converter 23, and the like may also be controlled by multiple ECUs. The ECU 27 reads output signals of various sensors and switches to detect the operating state of the vehicle and controls the engine 11, the transmission 12, the ISG inverter 18, the bidirectional DC-DC converter 23, and the like depending on the operating state of the vehicle and the like.

In the first embodiment, the ECU 27 performs a startup control by executing a startup control routine of FIG. 3 to be described later.

When a start request for the engine 11 is made, it is determined whether the high-voltage battery 19 has an abnormality such as a failure or an insufficient state of charge. When it is determined that the high-voltage battery does not have an abnormality, normal startup control is executed determining that enough power can be supplied from the high-voltage battery 19 to the high-voltage ISG 17. In the normal startup control, the engine 11 is cranked and started by driving the high-voltage ISG 17 with the power of the high-voltage battery 19.

On the other hand, when it is determined that the high-voltage battery has an abnormality, power boost-startup control is executed determining that not enough power can be supplied from the high-voltage battery 19 to the high-voltage ISG 17. In the power boost-startup control, the output voltage of the accessory battery 21 is first boosted by the bidirectional DC-DC converter 23, and electrical energy necessary to start the engine 11 is charged in the smoothing capacitor 26 by power output from the bidirectional DC-DC converter 23. The engine 11 is then cranked and started by driving the high-voltage ISG 17 with the electrical energy charged in the smoothing capacitor 26.

Processing in the startup control routine of FIG. 3 executed by the ECU 27 in the first embodiment will now be described.

Figure 3:
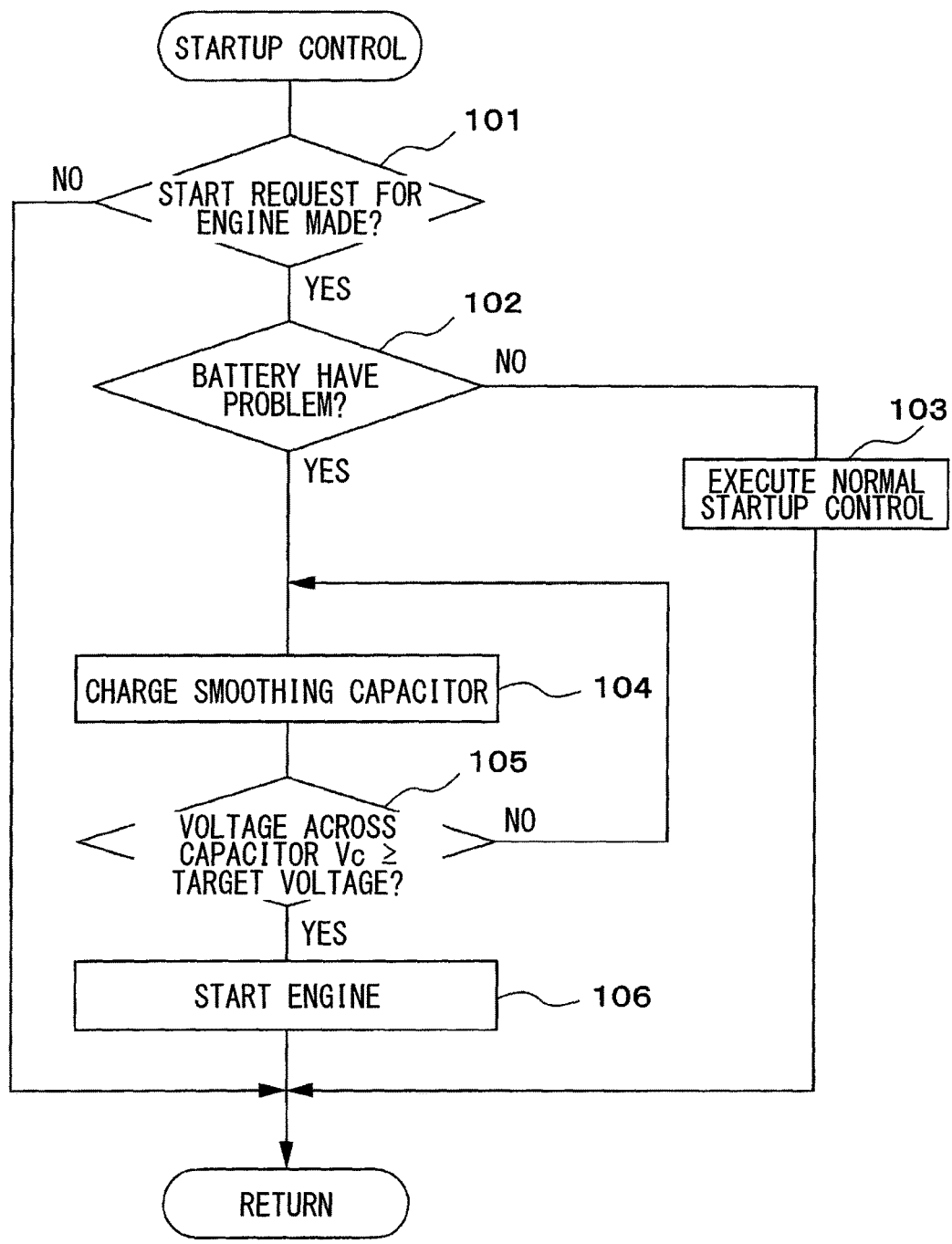
FIG. 3 is a flowchart illustrating a startup control routine according to the first embodiment.

The startup control routine illustrated in FIG. 3 is repeatedly executed with a predetermined cycle while the ECU 27 is powered on, and corresponds to a startup control portion of the present disclosure.

Once the present routine is initiated, it is first determined in S101 whether a start request for the engine 11 is made. When it is determined in S101 that the start request for the engine 11 is not made, the present routine is ended without executing processing in and after S102.

When it is thereafter determined in S101 the start request for the engine 11 is made, the routine proceeds to S102 and determines whether the high-voltage battery 19 has an abnormality such as a failure or an insufficient state of charge. S102 corresponds to an example of a high-voltage battery determination portion of the present disclosure.

Whether the high-voltage battery 19 has a failure is determined by determining, for example, whether the output voltage of the high-voltage battery 19 is lower than a predetermined value (such as the minimum value of the output voltage required for starting the engine 11) or whether a sensor detecting the output voltage of the high-voltage battery 19 has a failure.

Whether the high-voltage battery 19 has an insufficient state of charge is determined by determining, for example, whether the state of charge (SOC) of the high-voltage battery 19 is lower than a predetermined value (such as the minimum value of the SOC required for starting the engine 11). The SOC is defined by the following expression 1, for example.

SOC=remaining capacity/full charge capacity×100    (Expression 1)

When it is determined in S102 that the high-voltage battery does not have an abnormality, the routine proceeds to S103 and executes normal startup control determining that enough power can be supplied from the high-voltage battery 19 to the high-voltage ISG 17. In the normal startup control, the engine 11 is cranked and started by driving the high-voltage ISG 17 with the power of the high-voltage battery 19.

On the other hand, when it is determined in S102 that the high-voltage battery has an abnormality, power boost-startup control (S104 to S106) is executed as follows determining that not enough power can be supplied from the high-voltage battery 19 to the high-voltage ISG 17.

In S104, the output voltage of the accessory battery 21 is first boosted by the bidirectional DC-DC converter 23, and power output from the bidirectional DC-DC converter 23 is used to charge the smoothing capacitor 26 with electrical energy.

The routine thereafter proceeds to S105, where it is determined whether the electrical energy charged in the smoothing capacitor 26 is higher than or equal to the electrical energy required for starting the engine 11, on the basis of whether a voltage Vc across the smoothing capacitor 26 is higher than or equal to a target voltage. The target voltage is set to a voltage value at which the electrical energy charged in the smoothing capacitor 26 is higher than or equal to the electrical energy required for starting the engine 11.

When it is determined in S105 that the voltage Vc across the smoothing capacitor 26 is lower than the target voltage, the routine returns to S104 determining that the electrical energy charged in the smoothing capacitor 26 has not reached the electrical energy required for starting the engine 11.

When it is thereafter determined in S105 that the voltage Vc across the smoothing capacitor 26 is higher than or equal to the target voltage, the routine proceeds to S106 determining that the electrical energy charged in the smoothing capacitor 26 is higher than or equal to the electrical energy required for starting the engine 11. In S106, the engine 11 is cranked and started by driving the high-voltage ISG 17 with the electrical energy charged in the smoothing capacitor 26.

The first embodiment described above executes the power boost-startup control when it is determined that the high-voltage battery has an abnormality at the time the start request for the engine 11 is made. In the power boost-startup control, the output voltage of the accessory battery 21 is first boosted by the bidirectional DC-DC converter 23, and the power output from the bidirectional DC-DC converter 23 is used to charge the smoothing capacitor 26 with electrical energy. The engine 11 is then started by driving the high-voltage ISG 17 with the electrical energy charged in the smoothing capacitor 26. The engine 11 can thus be started by performing the power boost-startup control and driving the high-voltage ISG 17 with the power of the accessory battery 21 even when the high-voltage battery has an abnormality.

In addition, the electrical energy required for starting the engine 11 is temporarily charged in the smoothing capacitor 26 so that the high-voltage ISG 17 is driven by the electrical energy charged in the smoothing capacitor 26. This can prevent a sudden fluctuation in the voltage of the accessory battery 21 and an accompanying adverse effect on the accessory 20 due to the power consumed by the high-voltage ISG 17, while at the same time preventing an increase in power for instantaneous energization of the bidirectional DC-DC converter 23 and lowering the rated power of the bi-directional DC-DC converter 23. In addition, the SOC of the high-voltage battery 19 need not be maintained higher than or equal to a value required for starting the engine at all times in preparation for a next engine startup, whereby the lower limit for the usable range of the SOC of the high-voltage battery 19 can be lowered.

Second Embodiment

A second embodiment in which the present disclosure is applied to a hybrid vehicle will now be described with reference to FIG. 4 to FIG. 6. Note, however, that a part substantially identical to that of the first embodiment will be denoted by the reference numeral identical to that of the first embodiment and not be described or described in a simplified manner, whereby a part different from the first embodiment will mainly be described.

Figure 4:
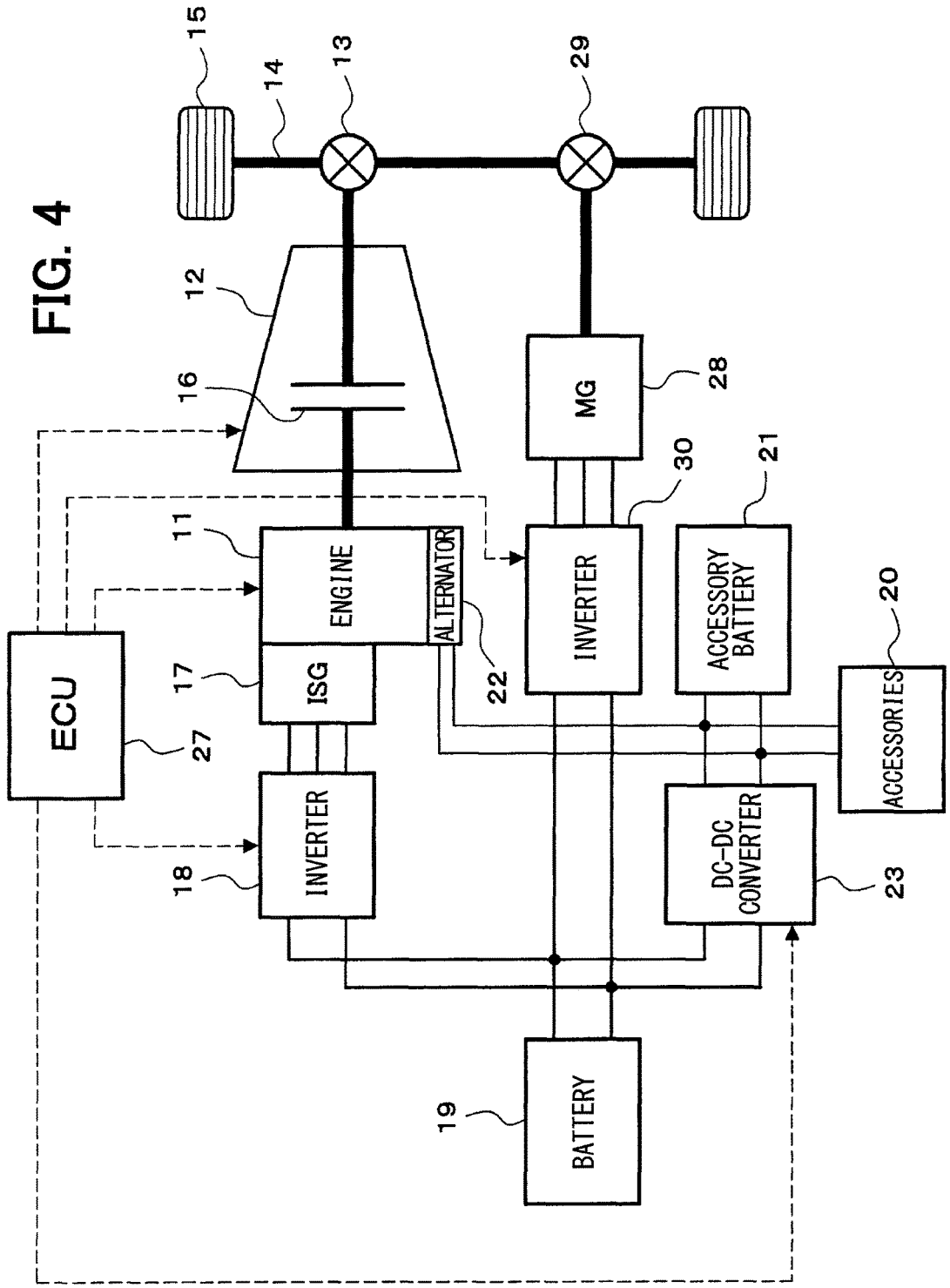
FIG. 4 is a diagram illustrating a schematic configuration of a hybrid vehicle drive control system according to a second embodiment.

In the second embodiment, an engine 11 and a traveling motor generator (MG) 28 are mounted as power sources of a vehicle as illustrated in FIG. 4. Power of an output shaft of the traveling MG 28 is transmitted to wheels 15 via a differential gear mechanism 29, an axle 14, and the like. An MG inverter 30 for driving the traveling MG 28 is connected to a high-voltage battery 19, so that the traveling MG 28 exchanges power with the high-voltage battery 19 via the MG inverter 30.

Figure 5:
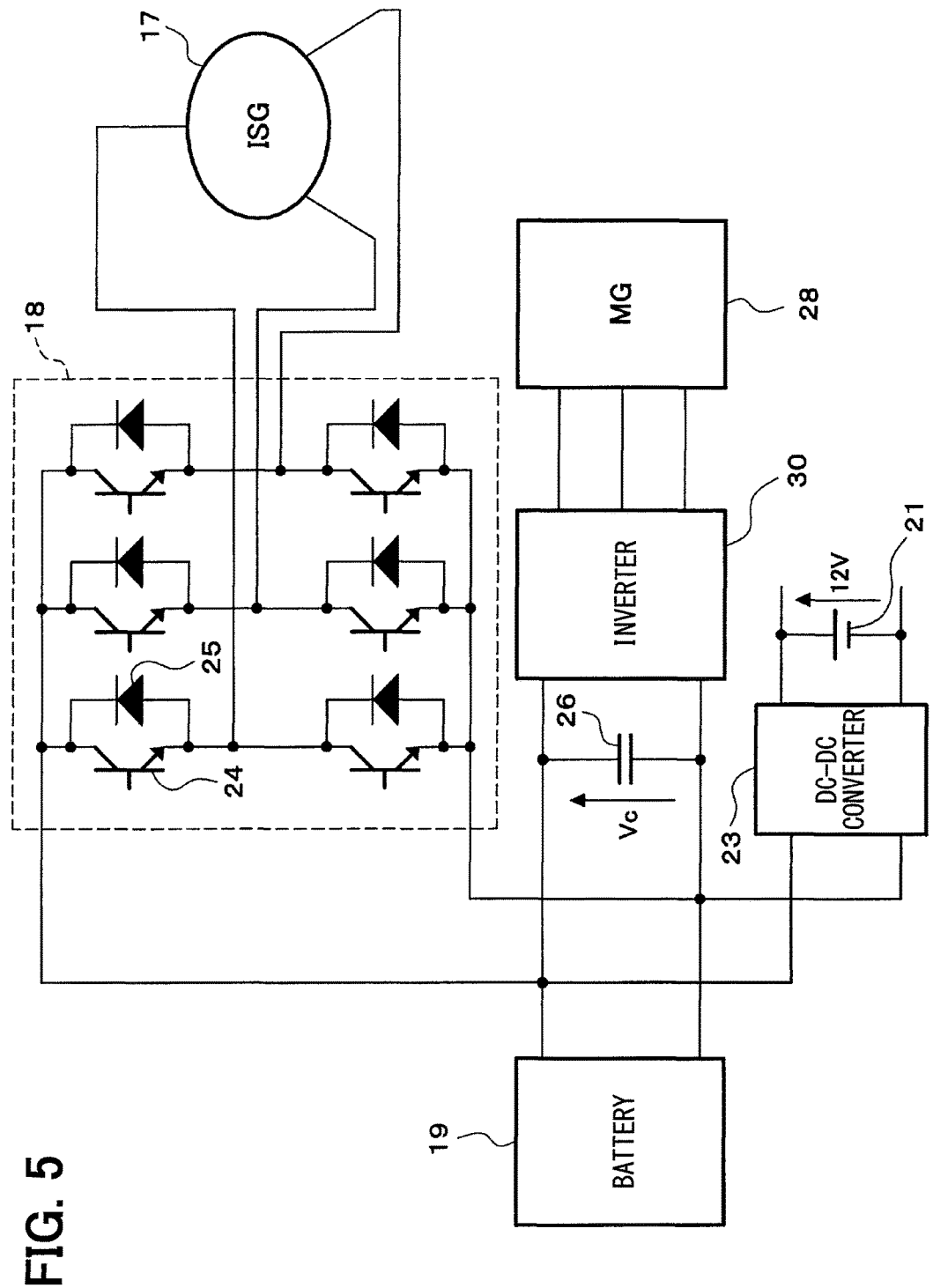
FIG. 5 is a diagram illustrating a circuit configuration of a system for driving a high-voltage ISG and a traveling MG according to the second embodiment.

As illustrated in FIG. 5, a smoothing capacitor 26 is connected between the high-voltage battery 19 and the MG inverter 30. The smoothing capacitor 26 may instead be incorporated in the MG inverter 30.

An ECU 27 switches a travel mode among an engine travel mode, an HV travel mode, and an EV travel mode depending on the operating state or the like of the vehicle. The engine travel mode performs engine travel in which the vehicle travels with the wheels 15 driven only by the power of the engine 11 out of the engine 11 and the traveling MG 28. The HV travel mode performs HV travel in which the vehicle travels with the wheels 15 driven by both the power of the engine 11 and the power of the traveling MG 28. The EV travel mode performs EV travel in which the vehicle travels with the wheels 15 driven only by the power of the traveling MG 28 out of the engine 11 and the traveling MG 28 while stopping combustion of the engine 11. At the time of deceleration of the vehicle or the like, regenerative power generation is performed to convert kinetic energy of the vehicle into electrical energy by the traveling MG 28, and the generated power is charged (collected) in the high-voltage battery 19.

In the case of a hybrid vehicle, the engine 11 can be started by driving a high-voltage ISG 17 with power generated by regenerative power generation when such power generation can be executed even when the high-voltage battery has an abnormality.

Figure 6:
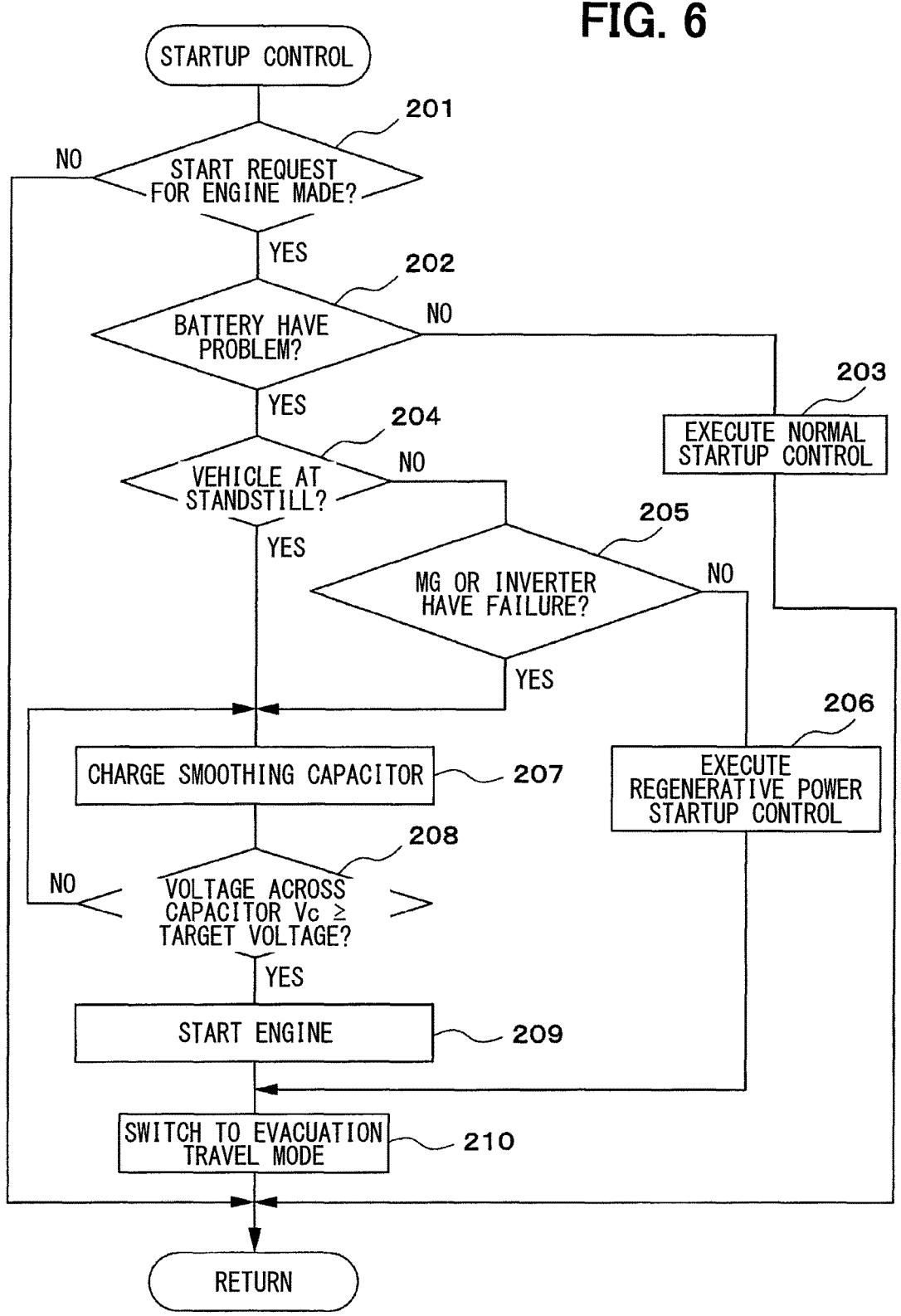
FIG. 6 is a flowchart illustrating a startup control routine according to the second embodiment.

The second embodiment is thus adapted such that, on the occurrence of a start request for the engine 11 upon execution of a startup control routine of FIG. 6 (to be described) by the ECU 27, it is determined whether regenerative power generation can be performed when the high-voltage battery is determined to have an abnormality, or power boost-startup control is executed when the high-voltage battery is determined to have an abnormality and at the same time regenerative power generation is determined to be unexecutable.

Processing in the startup control routine of FIG. 6 executed by the ECU 27 in the second embodiment will now be described.

In the startup control routine illustrated in FIG. 6, it is first determined in S201 whether a start request for the engine 11 is made. When it is determined in S201 the start request for the engine 11 is made, the routine proceeds to S202 and determines whether the high-voltage battery 19 has an abnormality such as a failure or an insufficient state of charge.

When it is determined in S202 that the high-voltage battery does not have an abnormality, the routine proceeds to S203 and executes normal startup control determining that enough power can be supplied from the high-voltage battery 19 to the high-voltage ISG 17.

On the other hand, when it is determined in S202 that the high-voltage battery has an abnormality, it is determined that not enough power can be supplied from the high-voltage battery 19 to the high-voltage ISG 17 and determined, in the following S204 and S205, whether regenerative power generation can be executed. Steps S204 and S205 correspond to an example of a regenerative power generation determination portion of the present disclosure.

The routine first proceeds to S204 and determines whether the vehicle is at a standstill. When it is determined in S204 that the vehicle is not at a standstill (that is, the vehicle is traveling), the routine proceeds to S205 and determines whether the traveling MG 28 or the MG inverter 30 has a failure.

It is determined that regenerative power generation cannot be executed when it is determined in S204 that the vehicle is at a standstill, or when it is determined in S205 that the traveling MG 28 or the MG inverter 30 has a failure. In this case, namely when it is determined that the high-voltage battery has an abnormality and at the same time regenerative power generation cannot be performed, the power boost-startup control (S207 to S209) is executed as follows.

In S207, the output voltage of an accessory battery 21 is first boosted by a bidirectional DC-DC converter 23, and power output from the bidirectional DC-DC converter 23 is used to charge the smoothing capacitor 26 with electrical energy.

The routine thereafter proceeds to S208 and determines whether a voltage Vc across the smoothing capacitor 26 is higher than or equal to a target voltage. The routine returns to S207 when it is determined in S208 that the voltage Vc across the smoothing capacitor 26 is lower than the target voltage.

When it is thereafter determined in S208 that the voltage Vc across the smoothing capacitor 26 is higher than or equal to the target voltage, the routine proceeds to S209, in which the engine 11 is cranked and started by driving the high-voltage ISG 17 with the electrical energy charged in the smoothing capacitor 26.

The routine thereafter proceeds to S210 and switches the travel mode to an evacuation travel mode. The EV travel is prohibited in the evacuation travel mode. The speed of the vehicle, the output and torque of the engine 11, and the like may also be limited. S210 corresponds to an example of a fail-safe portion of the present disclosure.

On the other hand, it is determined that regenerative power generation can be executed when it is determined in S204 that the vehicle is not at a standstill (that is, the vehicle is traveling) and at the same time determined in S205 that neither the traveling MG 28 nor the MG inverter 30 has a failure (that is, the traveling MG 28 and the MG inverter are normal). In this case, the routine proceeds to S206 and executes regenerative power startup control. The regenerative power startup control performs regenerative power generation to convert kinetic energy of the vehicle into electrical energy by the traveling MG 28, so that the engine 11 is cranked and started by driving the high-voltage ISG 17 with the generated power. The routine thereafter proceeds to S210 and switches the travel mode to the evacuation travel mode.

The second embodiment described above executes the power boost-startup control when it is determined that the high-voltage battery has an abnormality and at the same time regenerative power generation cannot be performed on the occurrence of the start request for the engine 11. The engine 11 can thus be started by executing the power boost-startup control and driving the high-voltage ISG 17 with the power of the accessory battery 21 even when the high-voltage battery has an abnormality and at the same time regenerative power generation cannot be executed. In the case where regenerative power generation can be performed even in the event of an abnormality with the high-voltage battery, the power boost-startup control is not executed to thus be able to prevent execution of the power boost-startup control more than necessary and reduce power consumption of the accessory battery 21.

The second embodiment switches the travel mode to the evacuation travel mode, which prohibits the EV travel, after the engine 11 is started by the power boost-startup control. This can avoid the power boost-startup control being executed again and again after the engine 11 is started by the power boost-startup control, thereby reducing the power consumption of the accessory battery 21 by the power boost-startup control.

Third Embodiment

A third embodiment in which the present disclosure is applied to a hybrid vehicle will now be described with reference to FIG. 7 to FIG. 9. Note, however, that a part substantially identical to that of the second embodiment will be denoted by the reference numeral identical to that of the second embodiment and not be described or described in a simplified manner, whereby a part different from the second embodiment will mainly be described.

Figure 7:
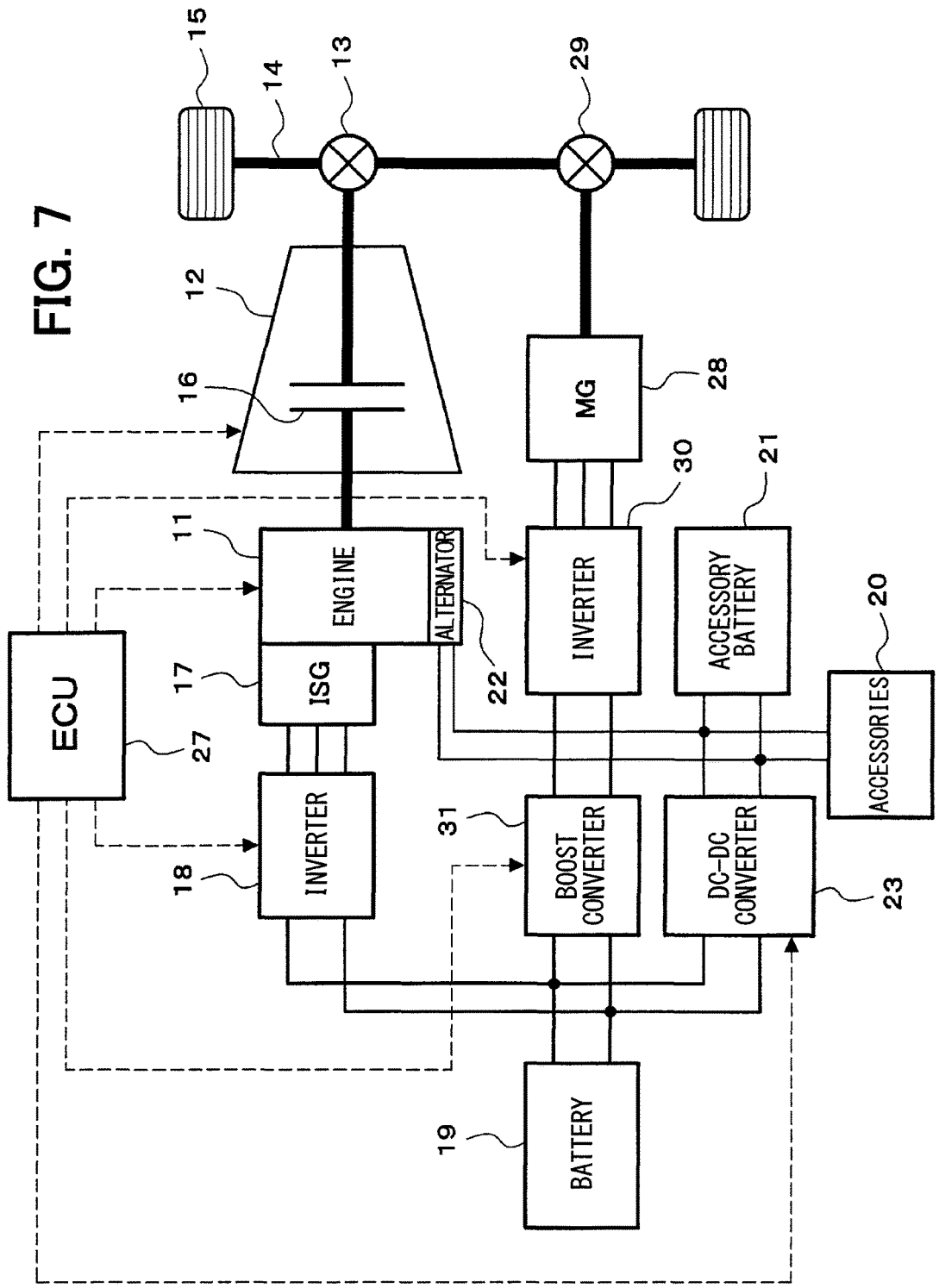
FIG. 7 is a diagram illustrating a schematic configuration of a hybrid vehicle drive control system according to a third embodiment.

In the third embodiment, a boost converter 31 is connected between a high-voltage battery 19 and an MG inverter 30 as illustrated in FIG. 7. The boost converter 31 has a function of boosting a voltage on the side of the high-voltage battery 19 and outputting the voltage to the side of the MG inverter 30, and a function of stepping down a voltage on the side of the MG inverter 30 and outputting the voltage to the side of the high-voltage battery 19.

Figure 8:
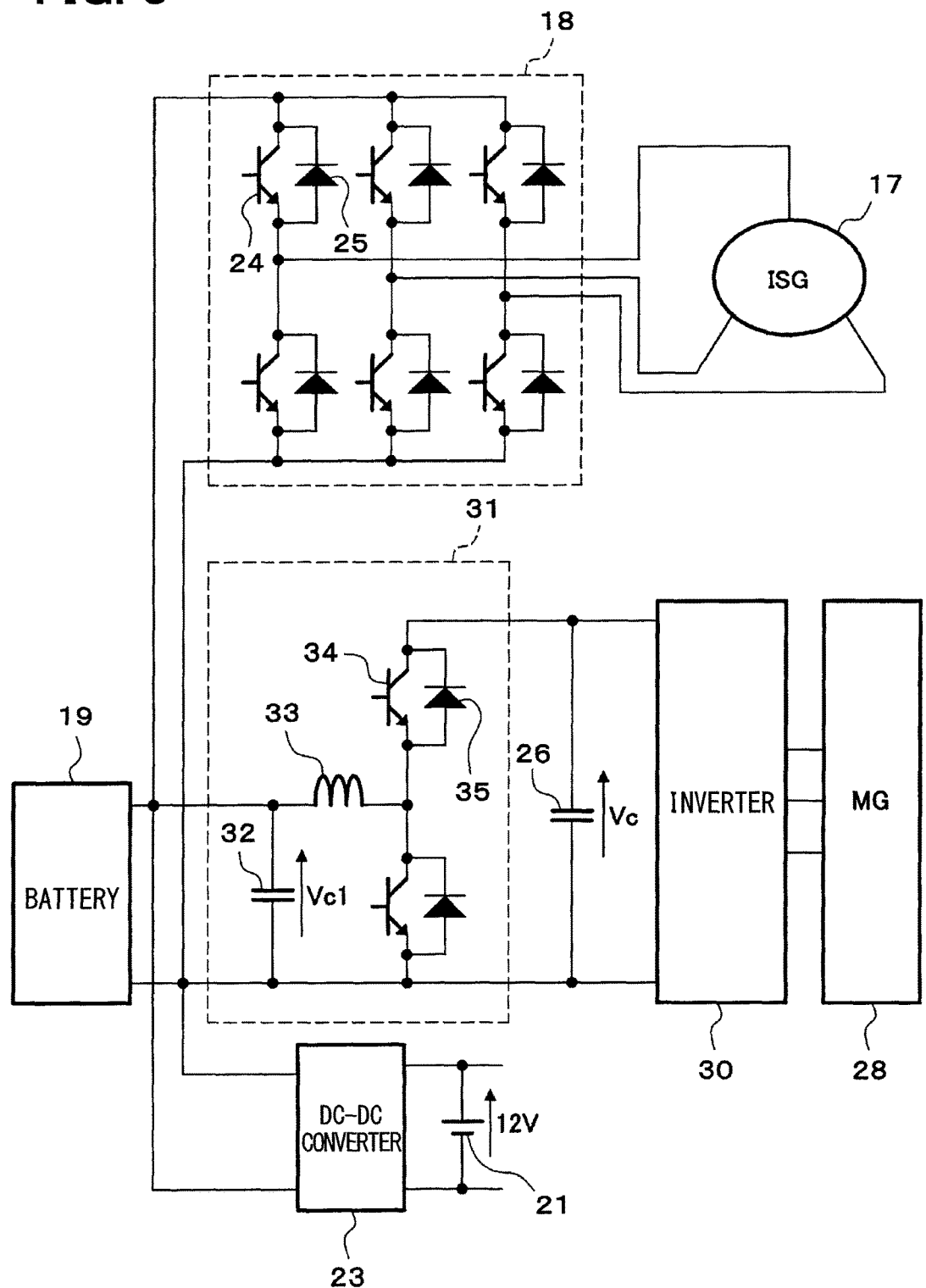
FIG. 8 is a diagram illustrating a circuit configuration of a system for driving a high-voltage ISG and a traveling MG according to the third embodiment.

As illustrated in FIG. 8, a smoothing capacitor 26 is connected between the boost converter 31 and the MG inverter 30. The smoothing capacitor 26 may instead be incorporated in the MG inverter 30. The boost converter 31 is provided with an input capacitor 32, a reactor 33, and two switching elements 34 each of which is connected in parallel to a freewheel diode 35.

Figure 9:
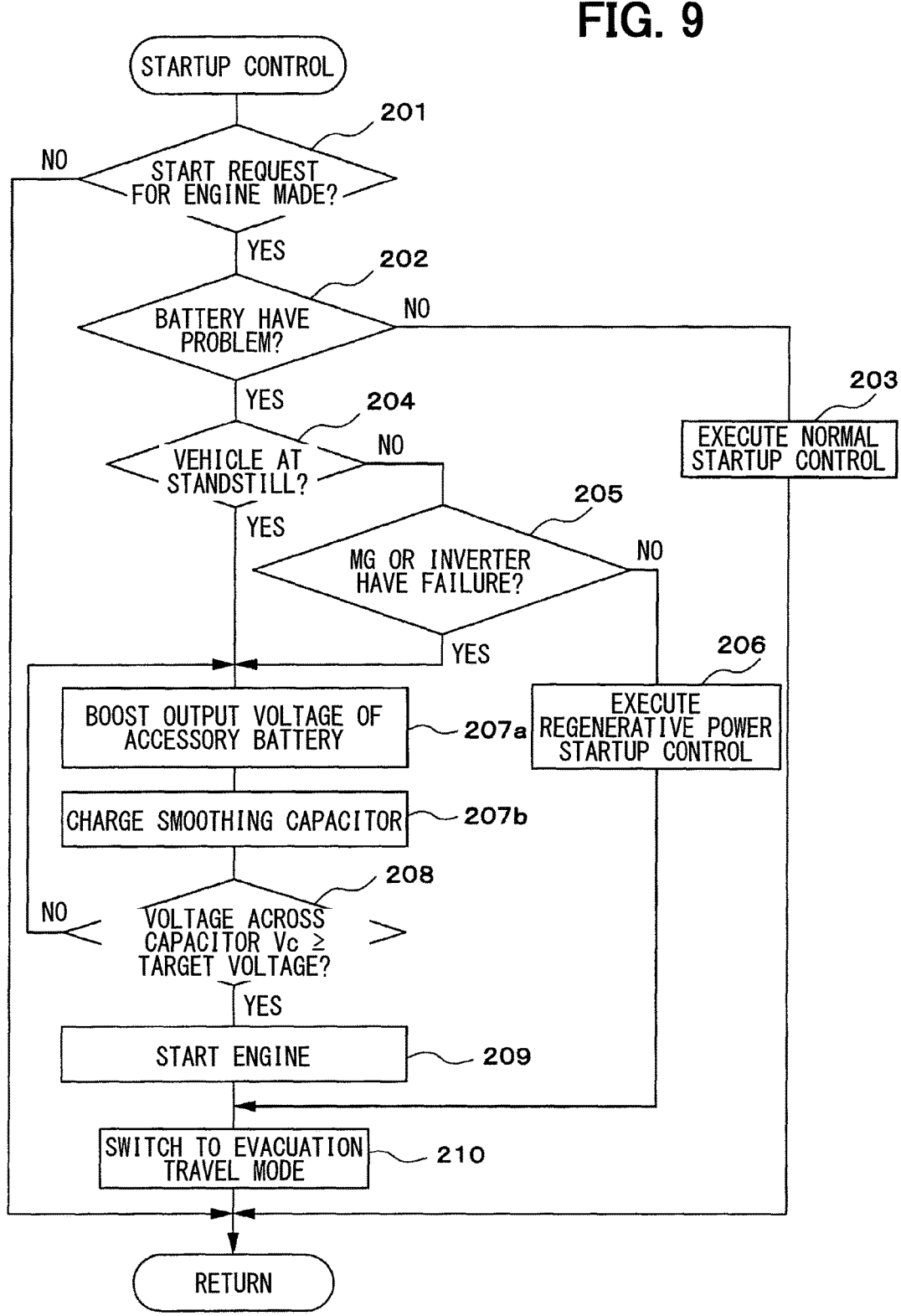
FIG. 9 is a flowchart illustrating a startup control routine according to the third embodiment.

In the third embodiment, a startup control routine of FIG. 9 to be described is executed by an ECU 27 so that an output voltage of a bidirectional DC-DC converter 23 is further boosted by the boost converter 31 at the time of power boost-startup control and that power output from the boost converter 31 is used to charge the smoothing capacitor 26.

The routine of FIG. 9 executed in the third embodiment is different from the routine of FIG. 6 described in the second embodiment in that the processing of S207 is changed to processing of S207a and S207b, but processing of the rest of the steps is the same as that of FIG. 6.

In the startup control routine of FIG. 9, it is determined that regenerative power generation cannot be executed when it is determined in S204 that the vehicle is at a standstill, or when it is determined in S205 that a traveling MG 28 or the MG inverter 30 has a failure. In this case, namely when it is determined that the high-voltage battery has an abnormality and at the same time regenerative power generation cannot be performed, the power boost-startup control (S207a to S209) is executed as follows.

First, in S207a, an output voltage of an accessory battery 21 is boosted by the bidirectional DC-DC converter 23. In S207b, the output voltage of the bidirectional DC-DC converter 23 is further boosted by the boost converter 31 so that power output from the boost converter 31 is used to charge the smoothing capacitor 26 with electrical energy.

The routine thereafter proceeds to S208 and determines whether a voltage Vc across the smoothing capacitor 26 is higher than or equal to a target voltage. The routine returns to S207a when it is determined in S208 that the voltage Vc across the smoothing capacitor 26 is lower than the target voltage.

When it is thereafter determined in S208 that the voltage Vc across the smoothing capacitor 26 is higher than or equal to the target voltage, the routine proceeds to S209, in which an engine 11 is cranked and started by driving a high-voltage ISG 17 with the electrical energy charged in the smoothing capacitor 26.

In the power boost-startup control of the third embodiment described above, the output voltage of the accessory battery 21 is boosted by the bidirectional DC-DC converter 23, and the output voltage of the bidirectional DC-DC converter 23 is further boosted by the boost converter 31 so that the power output from the boost converter 31 is used to charge the smoothing capacitor 26 with electrical energy. As a result, the output voltage of the accessory battery 21 can be boosted in two stages by the bidirectional DC-DC converter 23 and the boost converter 31 and charged in the smoothing capacitor 26, whereby the amount of electrical energy that can be charged can be increased with the same capacitance of the capacitor 26 compared to the case where the output voltage is not boosted by the boost converter 31. Therefore, as compared to the case where boosting is not performed by the boost converter 31, the capacitor 26 can have a smaller capacitance required to be charged with the electrical energy that is necessary for starting the engine 11, and can be reduced in size.

In each of the first to third embodiments, the present disclosure is applied to the system including the high-voltage ISG 17 as a starter that cranks the engine 11 and also serves as a generator. However, the present disclosure is not limited to such a case but may be applied to a system including a high-voltage starter not having a generator function, or a system using an MG serving as a power source of a vehicle as a starter.

In each of the first to third embodiments, some or all of the functions executed by the ECU 27 may be configured by hardware such as one or multiple ICs.

The output voltages of the high-voltage battery 19 and the accessory battery 21 are not limited to the ranges described in the above embodiments, but may be changed as appropriate. For example, the present disclosure can be applied and carried out when a vehicle has multiple secondary batteries with different output voltages such as a case where a secondary battery outputting a voltage of 24 V is provided as an accessory battery.

In the above-described embodiment, the EV travel is prohibited in the evacuation travel mode in order to prevent repetitive execution of the power boost-startup control, where the way to serve such purpose is not limited to prohibiting the EV travel. For example, a vehicle having a function that implements no idling to stop the engine at idle may be adapted to prohibit no idling in the evacuation travel mode.

The present disclosure is not limited to the hybrid vehicle configured as illustrated in FIG. 4 and FIG. 7, but can be applied to hybrid vehicles having various configurations equipped with an engine and an MG as power sources of the vehicles (such as a hybrid vehicle equipped with multiple MGs).

It is noted that a flowchart or the processing of the flowchart in the present application includes multiple steps (also referred to as sections), each of which is represented, for instance, as S101. Further, each step can be divided into several sub-steps while several steps can be combined into a single step.

While various embodiments, configurations, and aspects of a vehicle control apparatus according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A vehicle control apparatus comprising:
   an engine that serves as a power source of a vehicle;
   a starter that cranks the engine;
   an accessory battery that supplies power to an accessory of the vehicle;
   a high-voltage battery that supplies power to the starter and has an output voltage higher than an output voltage of the accessory battery;
   a DC-DC converter that is connected between the accessory battery and the high-voltage battery;
   a boost converter that is connected to be configured to boost an output voltage of the DC-DC converter;
   a capacitor that is connected to a circuit on a side of the high-voltage battery;
   a high-voltage battery determination portion that determines whether the high-voltage battery has an abnormality of a failure or an insufficient state of charge; and
   a startup control portion that starts the engine when a start request for the engine is made,
   wherein:
   the startup control portion drives the starter with the output voltage of the high-voltage battery when the high-voltage battery determination portion determines that the high-voltage battery has no abnormality; and
   the startup control portion executes power boost-startup control when the high-voltage battery determination portion determines that the high-voltage battery has an abnormality, the power boost-startup control boosting the output voltage of the accessory battery by the DC-DC converter, further boosting the output voltage of the DC-DC converter by the boost converter, charging the capacitor with electrical energy required to start the engine by using power output from the boost converter, and starting the engine by driving the starter with the electrical energy charged in the capacitor.

2. The vehicle control apparatus according to claim 1, further comprising:
   a motor generator that serves as a power source of the vehicle;
   an inverter that is connected between the motor generator and the high-voltage battery; and
   a regenerative power generation determination portion that determines whether regenerative power generation converting kinetic energy of the vehicle into electrical energy by the motor generator is executable,
wherein:
   the boost converter is disposed between the inverter and the high-voltage battery; and
   the startup control portion executes the power boost-startup control when the high-voltage battery determination portion determines that the high-voltage battery has an abnormality and the regenerative power generation determination portion determines that the regenerative power generation is inexecutable at a time that the start request for the engine is made.

3. The vehicle control apparatus according to claim 2, further comprising:
   a fail-safe portion that switches a travel mode to an evacuation travel mode prohibiting EV travel, on which the vehicle travels with power of the motor generator while stopping combustion of the engine, after the engine is started by the power boost-startup control.

* * * * *